United States Patent
Hernandez-Castaneda et al.

(10) Patent No.: US 10,216,006 B2
(45) Date of Patent: Feb. 26, 2019

(54) MULTIFOCAL LENS SUPPLY SYSTEM FOR PROVIDING TO A WEARER A CUSTOMIZED PROGRESSIVE SPECTACLE OPHTHALMIC LENS

(71) Applicant: Essilor International, Charenton le Pont (FR)

(72) Inventors: Martha Hernandez-Castaneda, Charenton le Pont (FR); Aude Contet, Charenton le Pont (FR); Farid Karioty, Charenton le Pont (FR); Cyril Guilloux, Charenton le Pont (FR)

(73) Assignee: ESSILOR INTERNATIONAL, Charenton le Pont (FR)

( * ) Notice: Subject to any disclaimer, the term of this patent is extended or adjusted under 35 U.S.C. 154(b) by 0 days.

(21) Appl. No.: 15/513,387

(22) PCT Filed: Sep. 28, 2015

(86) PCT No.: PCT/EP2015/072202
§ 371 (c)(1),
(2) Date: Mar. 22, 2017

(87) PCT Pub. No.: WO2016/050664
PCT Pub. Date: Apr. 7, 2016

(65) Prior Publication Data
US 2017/0299890 A1    Oct. 19, 2017

(30) Foreign Application Priority Data

Sep. 30, 2014   (EP) .................................... 14306539

(51) Int. Cl.
*G02C 7/02*    (2006.01)
*G02C 7/06*    (2006.01)

(52) U.S. Cl.
CPC ............ *G02C 7/028* (2013.01); *G02C 7/027* (2013.01); *G02C 7/065* (2013.01)

(58) Field of Classification Search
CPC ......... G02C 7/028; G02C 7/065; G02C 7/027
(Continued)

(56) References Cited

U.S. PATENT DOCUMENTS 6,318,859 B1    11/2001    Baudart et al.
2010/0091241 A1    4/2010    Lemay et al.
(Continued)

FOREIGN PATENT DOCUMENTS

EP    1 882 444 A1    1/2008
WO    2007/017766 A2    2/2007

OTHER PUBLICATIONS

D. D. Michaels, "Visual Optics and Refraction", a clinical approach, Presbyopia ,11 pages, 1975.
(Continued)

*Primary Examiner* — Tuyen Tra
(74) *Attorney, Agent, or Firm* — Oblon, McClelland, Maier & Neustadt, L.L.P.

(57) ABSTRACT

A multifocal lens supply system including a multifocal lens ordering computing unit and a multifocal lens determination computing unit, for providing to a wearer a customized progressive spectacle ophthalmic lens having a customized addition $Add_c$, wherein $Add_c = Add_p + corr$, wherein corr is a corrective value which is the output of a function where the input is at least an individual wearer parameter value and at least an output value over the input range is different from nil, and wherein $Add_p$ is a prescribed addition.

14 Claims, 15 Drawing Sheets

(58) Field of Classification Search
USPC .................. 351/159.01, 159.74, 159.73, 41
See application file for complete search history.

(56) References Cited

U.S. PATENT DOCUMENTS

| | | |
|---|---|---|
| 2010/0110373 A1 | 5/2010 | Drobe et al. |
| 2011/0001925 A1 | 1/2011 | Drobe et al. |
| 2012/0092614 A1 | 4/2012 | Drobe et al. |
| 2012/0268713 A1 | 10/2012 | Guilloux et al. |

OTHER PUBLICATIONS

J.C. Allary, "Cours d'optométrie", Chapitre 8: Détermination de l'addition au près, pp. 8-36-8-41, 2012.
International Search Report dated Dec. 7, 2015 in PCT/EP2015/072202 filed Sep. 28, 2015.

MULTIFOCAL LENS SUPPLY SYSTEM FOR PROVIDING TO A WEARER A CUSTOMIZED PROGRESSIVE SPECTACLE OPHTHALMIC LENS

The invention relates generally to the field of vision improvement and more specifically concerns a multifocal lens supply system for providing to a wearer a customized progressive spectacle ophthalmic lens.

The invention also concerns a method for determining a multifocal lens to be worn by a wearer for whom an addition has been prescribed in near-vision.

Furthermore, the invention concerns a multifocal lens supplied by the multifocal lens supply system of the invention.

Conventionally, spectacles lenses are manufactured on request in accordance with specifications intrinsic to individual wearers. Such specifications generally encompass a medical prescription made by an ophthalmologist or an eye care practitioner.

A wearer may thus be prescribed a positive or negative optical power correction. For presbyopic wearers, the value of the power correction is different for far vision and near vision, due to the difficulties of accommodation in near vision. The prescription thus comprises a far-vision power value and an addition representing the power increment between far vision and near vision. The addition is qualified as prescribed addition $Add_p$.

Based on the knowledge of the prescribed addition provided for individual wearers, ophthalmic lenses can be prepared. The addition value is commonly determined thanks to "standard" prescription methods such Jackson cross cylinder fixed or the "green/red method". These methods are described for example in the following references: "Cours d'optométrie, Jean-Charles Allary (September 2012; Opto-Com—Paris)" and "Visual optics and refraction, a clinical approach, David D. MICHAELS, 1975".

In these techniques, the addition (corresponding to the prescribed addition) is determined when the wearer is looking straight forward.

It is also described in the patent application EP 1 882 444 a method to determine the addition when the wearer's head is positioned in a reading position thanks to a skiascope.

However, for practical reasons, the ophthalmologist or the eye care practitioner usually determines the prescribed addition when the wearer is looking straight forward. Actually, determining the prescribed addition when the wearer's head is positioned in a reading position is time consuming and needs using devices that are not commonly available.

The inventors have noticed that the addition measured when the wearer is looking downwards is different from the addition measured when the wearer is looking straight forward.

A problem that the invention aims to solve is thus to provide a simple method that enables one to transpose the addition measured when the wearer is looking straight forward according to the need of the wearer in the reading position.

For this purpose, a subject of the invention is a multifocal lens supply system comprising a multifocal lens ordering computing unit and a multifocal lens determination computing unit wherein:

the multifocal lens ordering computing unit comprises:
an input interface to input data comprising at least prescription data for a wearer, the prescription data comprising a prescribed addition value $Add_p$ which is determined when the wearer is looking straight forward,
an output interface to output data from the multifocal lens ordering computing unit to the multifocal lens determination computing unit;

the multifocal lens determination computing unit comprises a determination computing unit to determine a customized multifocal ophthalmic lens for the wearer, wherein the multifocal lens determination computing unit comprises a customizing computing unit to provide a customized addition $Add_c$, where $Add_c = Add_p + corr$, wherein corr is a corrective value which is the output of a function where the input is at least an individual wearer parameter value and at least an output value over the input range is different from nil, so that the customized multifocal ophthalmic lens has an customized addition $Add_c$.

The inventors have discovered that the addition of a corrective value corr to the prescribed addition $Add_p$ allows reducing unwanted astigmatism while improving the wearing comfort for the wearer.

They have demonstrated that thanks to the addition of a said corrective value corr, the comfort of a wearer can be significantly improved when comparing to the initial progressive spectacle ophthalmic lens suitable to fulfil the requirements of the prescription data of the wearer.

One has to underline that according to common practice, a large majority of the prescribed addition value $Add_p$ determination are performed when the wearer is looking straight forward; this allows a simple determination of the prescribed addition value $Add_p$ that allow saving time for ophthalmologists or optometrists or eye care practitioners. Said prescribed addition value determination method is thus easy to implement and cost effective, but the inventors have demonstrated that the results that are obtained thanks to said determination method may not be optimal results, and that said results may be corrected according to the teaching of the present invention so as to obtain a customized addition $Add_c$ that better fulfils the actual wearer's needs.

A main benefit of the present invention is thus to offer a multifocal lens supply system where a simple rule is implemented that allows avoiding performing additional measurement steps to adjust a prescribed addition value $Add_p$ which is determined when the wearer is looking straight forward; thanks to the present invention, one can significantly enhance the comfort of the wearer. According to the inventors' knowledge, no prior document does neither disclose nor suggest adding a corrective value corr to the prescribed addition $Add_p$ when the prescribed addition value $Add_p$ is determined when the wearer is looking straight forward.

According to commonly used vocabulary, a prescribed addition value $Add_p$ relates to a near vision task.

One has to further underline that the customized addition $Add_c$ relates to same distance determination/measurement conditions than the ones of the prescribed addition value $Add_p$ which is determined when the wearer is looking straight forward; the customized addition $Add_c$ and the prescribed addition value $Add_p$ thus relate to features that are determined for a same reading distance. Said reading distance is usually chosen between 25 cm and less than 1 meter, preferably from 30 to 50 cm. According to an embodiment of the present invention, the prescribed addition value $Add_p$ is determined when the wearer is looking straight forward an object situated at a distance of 40 cm.

According to different embodiments of the present invention, that may be combined:
the corrective value corr is chosen according to following equation:

−0.7 D≤corr≤0.4 D; preferably −0.5 D≤corr≤0.25 D− corr=($\alpha_{NV}$/36)×corr2, with:
corr2 being chosen according to following equation:

−0.5 D≤corr2≤0.25 D, $\alpha_{NV}$ being an input data defining the near vision gaze direction elevation expressed in ° of the customized multifocal ophthalmic lens.

Said differential accommodation capacity can be determined as follows.
(i) providing a support comprising characters, for example a tablet;
(ii) bringing closer said support to a wearer eye's when the wearer is looking straight forward and determining a distance $d_f$ for which a sharp-blur transition is obtained when the wearer is reading said characters;
(iii) bringing closer said support to the wearer eye's when the wearer is looking downwards (in reading position) and determining a distance $d_d$ for which a sharp-blur transition is obtained when the wearer is reading said characters;
(iv) Determining the differential accommodation capacity according to the following equation $(1/d_f)-(1/d_d)$
the individual wearer parameter is the age of the wearer.
the corrective value corr is chosen according to following equations:
−0.5 D≤Corr≤−0.4 D, if the wearer is less than or equal to 50 years old;
−0.4 D≤Corr≤−0.1 D, if the wearer is greater than 50 and less than or equal to 60 years old;
0.0 D≤Corr≤0.25 D, if wearer is greater than 60 years old.
the corrective value corr depends on the used prescription method.
the corrective value corr is chosen according to following equations:
Corr=−0.4D if the wearer is less than 50 years old;
the near vision gaze direction elevation $\alpha_{NV}$ of the ophthalmic lens satisfies 28°≤$\alpha_{NV}$≤36°;
if the prescription method is the accommodation amplitude method for the addition value determination, the corrective value corr is chosen according to following equations:
−0.6 D≤Corr≤−0.4 D, if the wearer is less than or equal to 50 years old;
−0.4 D≤Corr≤−0.1 D, if the wearer is greater than 50 years old and less than or equal to 60;
0 D≤Corr≤0.3 D, if the wearer is greater than 60 years old;
if the prescription method is the Jackson cross cylinder method for the addition value determination, the corrective value corr is chosen according to following equations:
−0.4 D≤Corr≤−0.1 D, if the wearer is less than or equal to 50 years old;
Corr=0 D, if the wearer is greater than 50 years old;
If the prescription method is the red/green method for the addition value determination, the corrective value corr is chosen according to following equations:
−0.6 D≤Corr≤−0.4 D, if the wearer is less than or equal to 50 years old
−0.4≤Corr≤−0.1 D, if the wearer is greater than 50 years old.

the individual wearer parameter is the prescribed addition and
−0.6 D≤Corr≤−0.4 D, if Addp<2.0D
−0.4 D≤Corr≤−0.1 D, if 2.0D≤Addp<2.5 D
0.1 D≤Corr≤0.4 D, if Addp≥2.5 D.

Thus, the inventors have demonstrated that when:
the individual wearer parameter value is the age of the wearer, and/or
the individual wearer parameter value is the prescribed addition,
the function from which the corrective value corr is output is an increasing function.

In another aspect, the present invention also provides a method for determining a multifocal lens to be worn by a wearer for whom an addition has been prescribed in near-vision, comprises the step of
Providing data, said data comprising prescription data, the prescription data comprising a prescribed addition $Add_p$ obtained when the wearer is looking straight forward;
determining an customized addition $Add_c$ according to at least the prescribed addition $Add_p$, and where $Add_c=Add_p$+corr, corr being a non nil value;
Providing a multifocal lens with the customized addition.

According to an embodiment, said method is implemented thanks a multifocal lens ordering computing unit and a multifocal lens determination computing unit, the method comprising the steps of:
Providing, in an input interface, input data comprising at least prescription data for a wearer, the prescription data comprising a prescribed addition value $Add_p$ which is determined when the wearer is looking straight forward;
Outputting, from an output interface, output data from the multifocal lens ordering computing unit to the multifocal lens determination computing unit;
Calculating a customized multifocal ophthalmic lens thanks to the determination computing unit comprising a determination computing unit to determine the customized multifocal ophthalmic lens for the wearer, wherein the multifocal lens determination computing unit comprises a customizing computing unit to provide a customized addition $Add_c$, where $Add_c=Add_p$+corr, wherein corr is a corrective value which is the output of a function where the input is at least an individual wearer parameter value and at least an output value over the input range is different from nil, so that the customized multifocal ophthalmic lens has an customized addition $Add_c$.

According to this method, the eye care specialist may determine, for example from database stored in his computer or stored in a server, the customized addition $Add_c$ as a function of an individual wearer parameter value.

According to another embodiment of said method for determining a multifocal lens to be worn by a wearer, the multifocal lens is a progressive ophthalmic lens and the method further comprises the step of:
choosing an initial distribution of power and an initial distribution of astigmatism for each gaze direction under wearing conditions corresponding to a lens suitable for fulfilling the requirements of the prescription data for the wearer;
providing a meridian line, a far vision gaze direction, a near vision gaze direction and an initial addition value $Add_{ini}$ from the initial distribution;
Calculating first transformation coefficients from the difference $(Add_{ini}-Add_c)$;

Determining a second distribution of the power and resulting astigmatism by applying the calculated first transformation coefficients to the initial distribution in order to obtain the customized addition at the near vision gaze direction;

choosing a k value satisfying 0%≤k≤100%;

Determining a first reference gaze direction $Dir1(\alpha1;\beta1)$ on the meridian line for the initial distribution wherein the difference in mean power between the first gaze direction and the far vision gaze direction satisfies $k \times Add_{ini}$;

Determining a second reference gaze direction $Dir2(\alpha2;\beta2)$ on the meridian line for the second distribution wherein the difference in mean power between the second gaze direction and the far vision gaze direction satisfies $k \times Add_{ini}$;

Calculating second transformation coefficients from the differences $(\alpha2-\alpha1; \beta2-\beta1)$;

Determining a third distribution of the power and resulting astigmatism by applying the calculated second transformation coefficients to the second distribution in order to obtain a difference in mean power equal to $k \times Add_{ini}$ at the first gaze direction Dir1.

According to an embodiment, $Add_{ini}=Add_p$.

According to an embodiment, k value is set at 85%.

According to another embodiment, the data further comprise wearing conditions.

In another aspect, the present invention also provides a multifocal lens supplied by the multifocal lens supply system according to the invention.

In still another aspect, the present invention relates to a computer program product comprising one or more stored sequence of instruction that is accessible to a processor and which, when executed by the processor, causes the processor to carry out at least one of the steps of the different embodiments of the preceding method.

The invention also relates to a computer-readable medium carrying one or more sequences of instructions of the preceding computer program product.

DESCRIPTION OF THE DRAWINGS

The features of the present invention, as well as the invention itself, both as to its structure and its operation, will be best understood from the accompanying non limiting drawings and examples, taken in conjunction with the accompanying description, in which.

DEFINITIONS

The following definitions are provided to describe the present invention.

The wordings "wearer's prescription", also called "prescription data", are known in the art. Prescription data refers to one or more data obtained for the wearer and indicating for at least an eye, preferably for each eye, a prescribed sphere $SPH_p$, and/or a prescribed astigmatism value $CYL_p$ and a prescribed axis $AXIS_p$ suitable for correcting the ametropia of each eye for the wearer and, if suitable, a prescribed addition $Add_p$ suitable for correcting the presbyopia of each of his eye. The prescription data are usually determined for a wearer when looking in far vision conditions; accordingly $SPH_{p\_FV}$, $CYL_{p\_FV}$, $AXIS_{p\_FV}$, $Add_{p\_FV}$ are determined where the index "FV" means "far vision".

The prescription data may also be determined in other conditions; for example the prescription data may also be determined for a wearer when looking in near vision conditions; accordingly $SPH_{p\_NV}$, $CYL_{p\_NV}$, $AXIS_{p\_NV}$, $Add_{p\_NV}$ are determined.

The sphere for each eye for near (proximate) vision is obtained by summing the prescribed addition $Add_p$ to the far vision prescribed sphere $SPH_{p\_FV}$ prescribed for the same eye: $SPH_{p\_NV}=SPH_{p\_FV}+Add_p$, where the index "NV" means "near vision". In the case of a prescription for progressive lenses, prescription data comprise wearer data indicating at least an eye, preferably for each eye, values for $SPH_{FV}$, $CYL_{FV}$ and $Add_p$.

"Spectacle ophthalmic lenses" are known in the art. According to the invention, the spectacle ophthalmic lens may be selected from single vision lens (also called monofocal or unifocal lens), multifocal lens such as for example a bifocal lens, a trifocal lens, a progressive or a degressive (mid-distance) lens. The lens may also be a lens for information glasses, wherein the lens comprises means for displaying information in front of the eye. The lens may also be suitable for sunglasses or not. Preferred lenses according to the invention are single vision lenses or progressive multifocal ophthalmic lenses. All ophthalmic lenses of the invention may be paired so as to form a pair of lenses (left eye LE, right eye RE).

Figure 1:
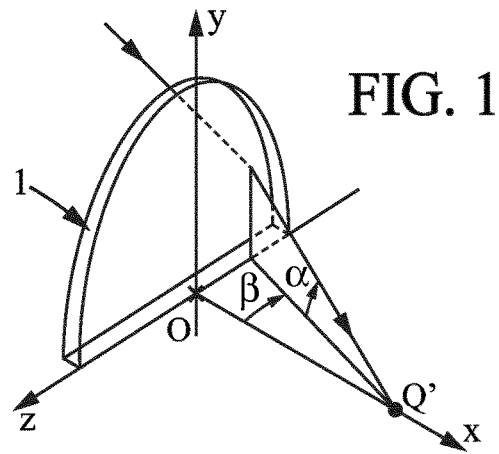
FIGS. 1 to 3 show, diagrammatically, optical systems of eye and lens and ray tracing from the center of rotation of the eye.
Figure 2:
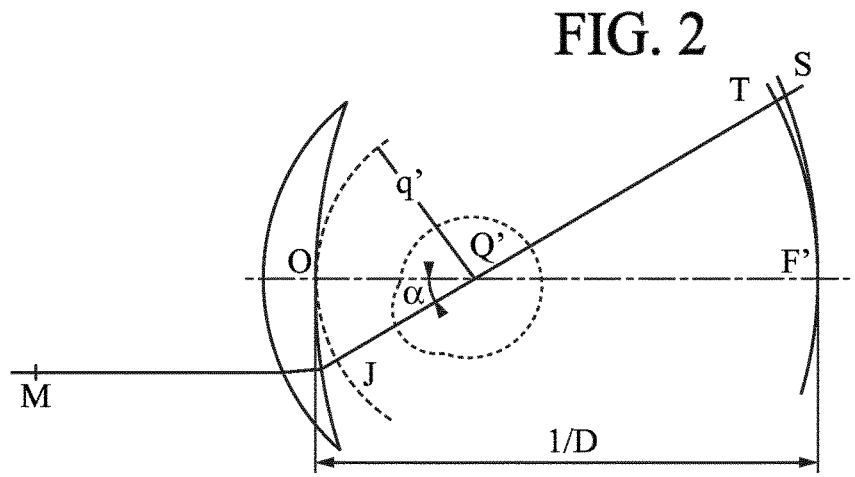

A "gaze direction" can be identified by a couple of angle values $(\alpha,\beta)$, wherein said angles values are measured with regard to reference axes centered on the center of rotation of the eye. More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze direction. This axis cuts the front surface of the lens on a point called the fitting point, which is present on lenses to enable the positioning of lenses in a frame by an optician. The fitting point corresponds to a lowering angle $\alpha$ of 0° and an azimuth angle $\beta$ of 0°. The point of intersection of the rear surface of the lens and the axis Q'F' is the point O. O can be the fitting point if it is located on the rear surface. A vertex sphere, of center Q', and of radius q', which is intercepting the rear surface of the lens in a point of the horizontal axis. As examples, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J (see FIG. 2) of the vertex sphere; the angle β is the angle formed between the axis Q'F' and the projection of the straight line Q'J on the horizontal plane comprising the axis Q'F'; this angle appears on the scheme on FIG. 1. The angle α is the angle formed between the axis Q'J and the projection of the straight line Q'J on the horizontal plane comprising the axis Q'F'; this angle appears on the scheme on FIGS. 1 and 2. A given gaze view thus corresponds to a point J of the vertex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

For each gaze direction (α,β), a mean refractive power Popt(α,β), a module of astigmatism Ast(α,β) and an axis Ax(α,β) of this astigmatism, and a module of resulting (also called residual or unwanted) astigmatism Asr(α,β) are defined.

"Ergorama" is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the vertex sphere:

ProxO=1/MJ

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

The optical power is also called refractive power

By analogy with the case of a thin lens, it can therefore be defined, for a given gaze direction and for a given object proximity, i.e. for a point of the object space on the corresponding light ray, an optical power Popt as the sum of the image proximity and the object proximity.

Popt=ProxO+ProxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens.

Figure 3:
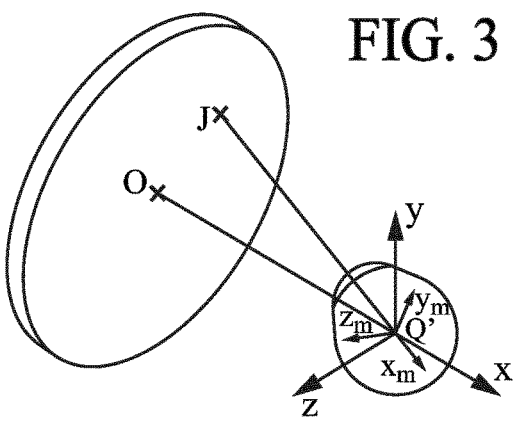

FIG. 3 represents a perspective view of a configuration wherein the parameters α and β are non-zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is orientated from the lens towards the eye. The y axis is vertical and orientated upwardly. The z axis is such that the frame {x, y, z} is orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically.

When referring to geometrical properties of a lens, one defines a "front surface" and a "back surface" of said lens, where the back surface is positioned on the side of the lens closest to a wearer's eye and the front surface is positioned on the opposite side of the lens when the spectacle ophthalmic lens is worn by the wearer. The front surface and the back surface geometrical characterizations, the relative geometrical spatial position of the front surface and the back surface, the refractive index of the material between said two surfaces, an ergorama and wearing conditions are data that permit calculating optical features of the lens for said given ergorama and wearing conditions.

Figure 4:
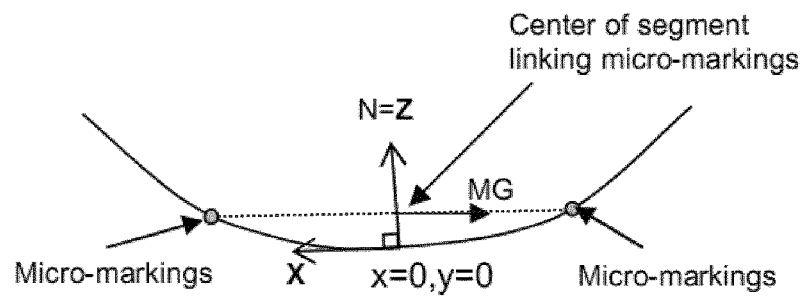
FIGS. 4 and 5 show referentials defined with respect to micro-markings, for a surface bearing micro-markings and for a surface not bearing the micro-markings respectively.
Figure 5:
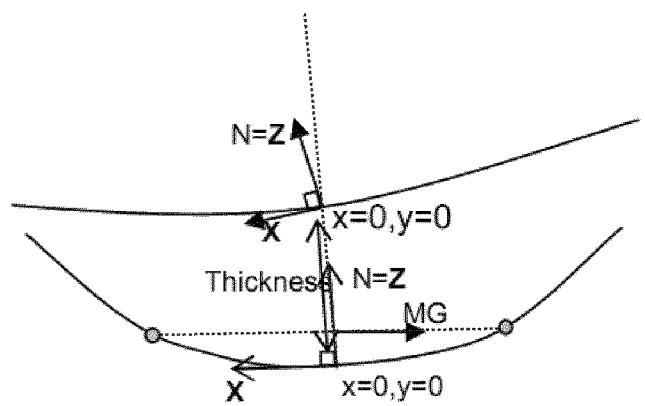

Accordingly, in the case of an ophthalmic lens, the characterization may be of a surface or optical kind. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 4 and 5. The referential (x,y,z) of said figures is a direct orthonormal referential.

The values in optic terms can be expressed for gaze directions. Gaze directions are usually given by their degree of lowering and azimuth in a frame whose origin is the center of rotation of the eye. When the lens is mounted in front of the eye, a point called the fitting point (referred as FP) is placed before the pupil or before the eye rotation center Q' of the eye for a primary gaze direction. The primary gaze direction corresponds to the situation where a wearer is looking straight ahead. In the chosen frame, the fitting point corresponds thus to a lowering angle α of 0° and an azimuth angle β of 0° whatever surface of the lens the fitting point is positioned—rear surface or front surface.

In the remainder of the description, terms like <<up>>, <<bottom>>, <<horizontal>>, <<vertical>>, <<above>>, <<below>>, or other words indicating relative position may be used. These terms are to be understood in the wearing conditions of the lens. Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y value corresponding to the fitting point and the "lower" part of the surface of a lens corresponds to a negative value along the y axis in the frame as defined above with respect to FIGS. 4 and 5, and preferably to a value along the y axis inferior to the y_value at the fitting point.

A "top to bottom axis" is thus defined for α varying from a maximum positive value to a most negative value when β is equal to nil. When considering the front surface and the back surface of the lens, "top to bottom axis" corresponds to the y axis.

The "meridian line" ($α_m$, $β_m$) of a progressive lens may a line defined from top to bottom of the lens and passing through the fitting point: for each lowering of the view of an angle α=$α_m$ between the gaze direction corresponding to the fitting point and the bottom of the lens, the gaze direction ($α_m$, $β_m$) is searched by ray tracing, in order to be able to see clearly the object point located in the median plane, at the distance determined by the ergorama. For each raising of the view of an angle α=$α_m$ between the gaze direction corresponding to the fitting point and the top of the lens, ($α_m$, $β_m$)=($α_m$,0). The median plane is the median plane of the head, preferentially passing through the base of the nose. This plane may also be passing through the middle of right and left eye rotation centers. Thus, all the gaze directions defined in that way form the meridian line of the ergorama-eye-lens system. For personalization purpose, postural data of the wearer, such as angle and position of the head in the environment, might be taken into account to determine the object position. For instance, the object position might be positioned out of median plane to model a wearer lateral shift in near vision.

The meridian line of the lens represents the locus of mean gaze directions of a wearer when he is looking from far to near visions.

The meridian line is usually contained in a vertical plane above the fitting point, and deflected towards the nasal side below the fitting point.

The "meridian line" of a single vision (monofocal) lens is defined as the vertical straight line passing through the optical center, OC, of the lens, where the "optical center" is the intersection of the optical axis, OA, with the front surface of a lens; the optical center, OC, thus corresponds to ($α_{OC}$, $β_{OC}$)=(0,0).

The "surface meridian line" 32 of a lens surface is defined as follow: each gaze direction ($α_m$, $β_m$) belonging to the meridian line of the lens intersects in wearing conditions the surface in a point ($x_m$, $y_m$) according to ray tracing.

The surface meridian line is the set of points corresponding to the gaze directions of the meridian line of the lens.

Figure 6:
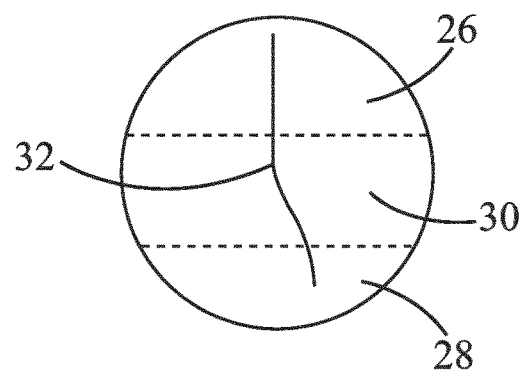
FIG. 6 shows field vision zones of a lens.
Figure 7:
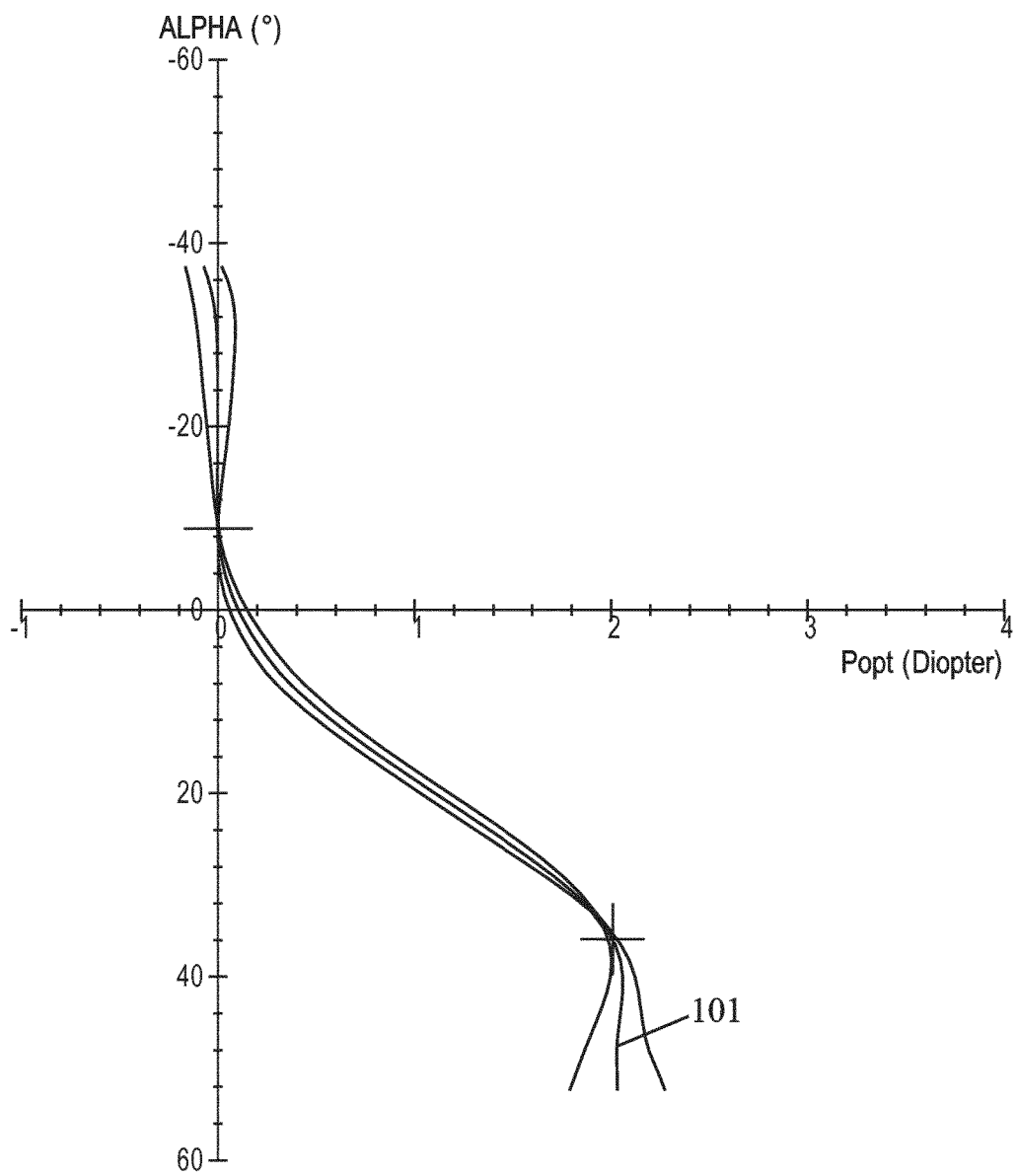
FIGS. 7 to 12 give optical and surface characteristics of an initial progressive spectacle ophthalmic lens.

The "visual field zones" seen through a progressive lens are known to the skilled person and are schematically illustrated in FIGS. 6 and 7. The lens comprises a far vision (distant vision) zone 26 located in the upper part of the lens, a near vision zone 28 located in the lower part of the lens and an intermediate zone 30 situated between the far vision zone 26 and the near vision zone 28. The lens also has a surface meridian line 32 belonging for example to the front surface and passing through the three zones and defining a nasal side and a temporal side.

A "far-vision gaze direction" is defined for a lens, as the vision gaze direction corresponding to the far vision (distant) reference point, referred as FVP, and thus ($α_{FV}$, $β_{FV}$), where the refractive power is substantially equal to the prescribed power in far vision. It may also be defined as the gaze direction corresponding to the fitting point, FP, in which case α=β=0°. Within the present disclosure, far-vision is also referred to as distant-vision.

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis;

A "minimum curvature" $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in $m^{-1}$.

A "maximum curvature" $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in $m^{-1}$.

"Minimum and maximum spheres" labeled $SPH_{min}$ and $SPH_{max}$ can be deduced according to the kind of surface considered.

When the surface considered is the object side surface (front surface), the expressions are the following:

$$SPH_{min} = (n-1)*CURV_{min} = \frac{n-1}{R_{max}} \text{ and}$$

$$SPH_{max} = (n-1)*CURV_{max} = \frac{n-1}{R_{min}}$$

where n is the refractive index of the constituent material of the lens.

If the surface considered is an eyeball side surface (rear surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the refractive index of the constituent material of the lens.

A "mean sphere" $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

$$SPH_{mean} = \frac{n-1}{2}\left(\frac{1}{R_{min}} + \frac{1}{R_{max}}\right)$$

if the surface is the object side surface, $$SPH_{mean} = \frac{1-n}{2}\left(\frac{1}{R_{min}} + \frac{1}{R_{max}}\right)$$

if the surface is an eyeball side surface,

A cylinder CYL is also defined by the formula $CYL=|SPH_{max}-SPH_{min}|$.

A "cylinder axis" $\gamma_{AX}$ is the angle of the orientation of the maximum curvature $CURV_{max}$ with relation to a reference axis and in the chosen direction of rotation. In the TABO convention, the reference axis is horizontal (the angle of this reference axis is 0°) and the direction of rotation is counterclockwise for each eye, when looking to the wearer ($0° \leq \gamma_{AX} \leq 180°$). An axis value for the cylinder axis $\gamma_{AX}$ of +45° therefore represents an axis oriented obliquely, which when looking to the wearer, extends from the quadrant located up on the right to the quadrant located down on the left.

The characteristics of any aspherical face of the lens may be expressed by means of the local mean spheres and cylinders.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

"Micro-markings" also called "alignment reference marking" have been made mandatory on progressive lenses by the harmonized standards ISO 13666:2012 ("Alignment reference marking: permanent markings provided by the manufacturer to establish the horizontal alignment of the lens or lens blank, or to re-establish other reference points") and ISO 8990-2 ("Permanent marking: the lens has to provide at least following permanent markings: alignment reference markings comprising two markings distant from 34 mm one of each other, equidistant from a vertical plane passing through the fitting point or the prism reference point"). Micro-markings that are defined the same way are also usually made on complex surfaces, such as on a front surface of a lens with a front surface comprising a progressive or regressive front surface.

"Temporary markings" may also be applied on at least one of the two surfaces of the lens, indicating positions of control points (reference points) on the lens, such as a control point for far-vision, a control point for near-vision, a prism reference point and a fitting point for instance. The prism reference point PRP is considered here at the midpoint of the straight segment which connects the micro-markings. If the temporary markings are absent or have been erased, it is always possible for a skilled person to position the control points on the lens by using a mounting chart and the permanent micro-markings. Similarly, on a semi-finished lens blank, standard ISO 10322-2 requires micro-markings to be applied. The centre of the aspherical surface of a semi-finished lens blank can therefore be determined as well as a referential as described above.

"inset" is known in the art and may be defined as follows. In a progressive addition lens, the near-vision point (the near-vision point corresponds to the intersection with the gaze direction allowing the wearer to gaze in near-vision, this gaze direction belonging to the meridian line) can be shifted horizontally with respect to a vertical line passing through the distance-vision point, when the lens is in a position of use by its wearer. This shift, which is in the direction of the nasal side of the lens, is referred to as "inset". It generally depends on a number of parameters, such as the optical power of the lens, the distance of observation of an object, the prismatic deviation of the lens and the eye-lens distance, notably. The inset may be an entry parameter selected by an optician at the time of lens order. Inset may be determined by computation or by ray tracing based upon the order data (prescription data).

A multifocal lens supply system comprises a plurality of interfaces and computing units so as to input data suitable for providing a lens for a wearer and to output data suitable for manufacturing a lens for said wearer.

In the present invention, the multifocal supply system comprises a multifocal lens ordering computing unit and a multifocal lens determination computing unit, said multifocal lens determination computing unit comprising a customizing computing unit.

According to the invention, computing units can be on different sites. For example, the multifocal lens ordering computing unit can be in the eye care practitioner and the multifocal lens determination computing unit can be in the lens manufacturer.

The ordering computing unit, the determination computing unit and the customizing computing unit may be a computer entity and may comprise a memory (MEM). The computing units may be connected to each other through one or more servers. Said servers may comprise storing means in the form of a memory.

Memories are known in the art and the skilled person is familiar with memories that that suitable for implementation within a lens supply system. The memory may be suitable for storing data, such as: input data, output data, intermediate data (such as intermediate computation results). The memory may be useful as a working memory and/or to store sequence of instructions. The memory may be provided in one or more storing elements/means, and may be part of a server.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

EXAMPLE

According to an example of the present invention, prescription data of the wearer are following:
the prescribed far vision mean SPH is +2D (D for Diopter)
the prescribed astigmatism value $CYL_{FV}$ is 0D
the prescribed addition ($Add_p$) IS 2D
The initial progressive spectacle ophthalmic lens suitable to fulfil the requirements of the prescription data of the wearer is a progressive spectacle ophthalmic lens having a refractive index of n=1.665.

Features of the initial progressive spectacle ophthalmic lens are illustrated by FIGS. 7 to 12.

The front surface of the initial progressive spectacle ophthalmic lens is a sphere with a radius of 95 mm.

Figure 8:
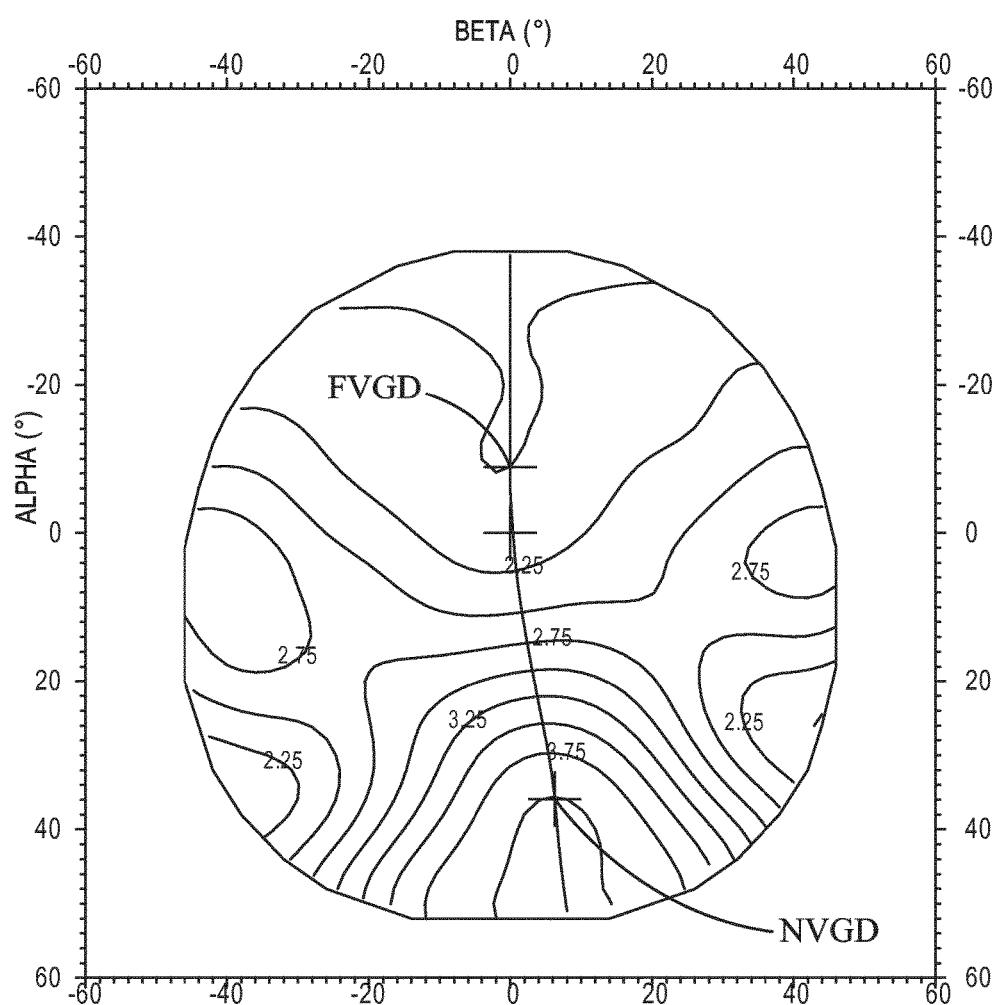
Figure 9:
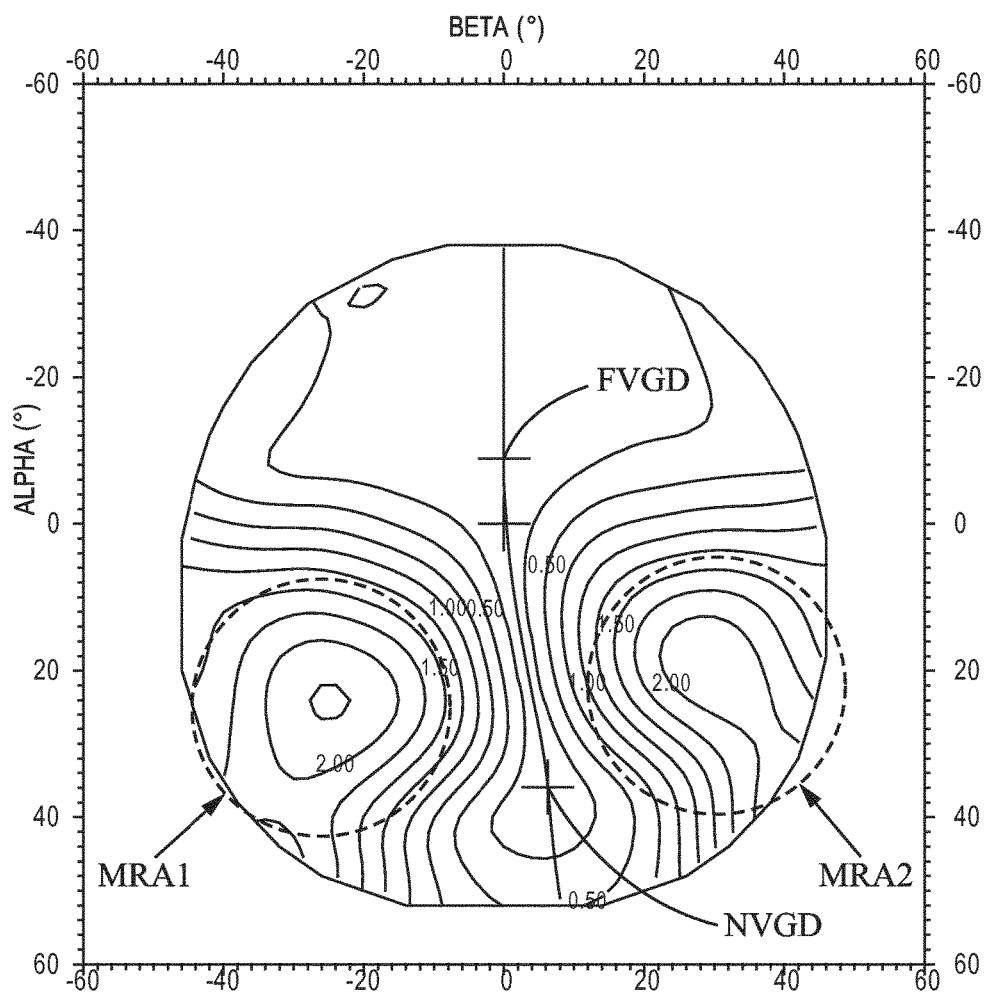

FIGS. 7, 8, 9 represent respectively the power profile along the meridian line, the power contour plot and the astigmatism contour plot of the initial progressive spectacle ophthalmic lens suitable to fulfil the requirements of the prescription data of the wearer.

Figure 10:
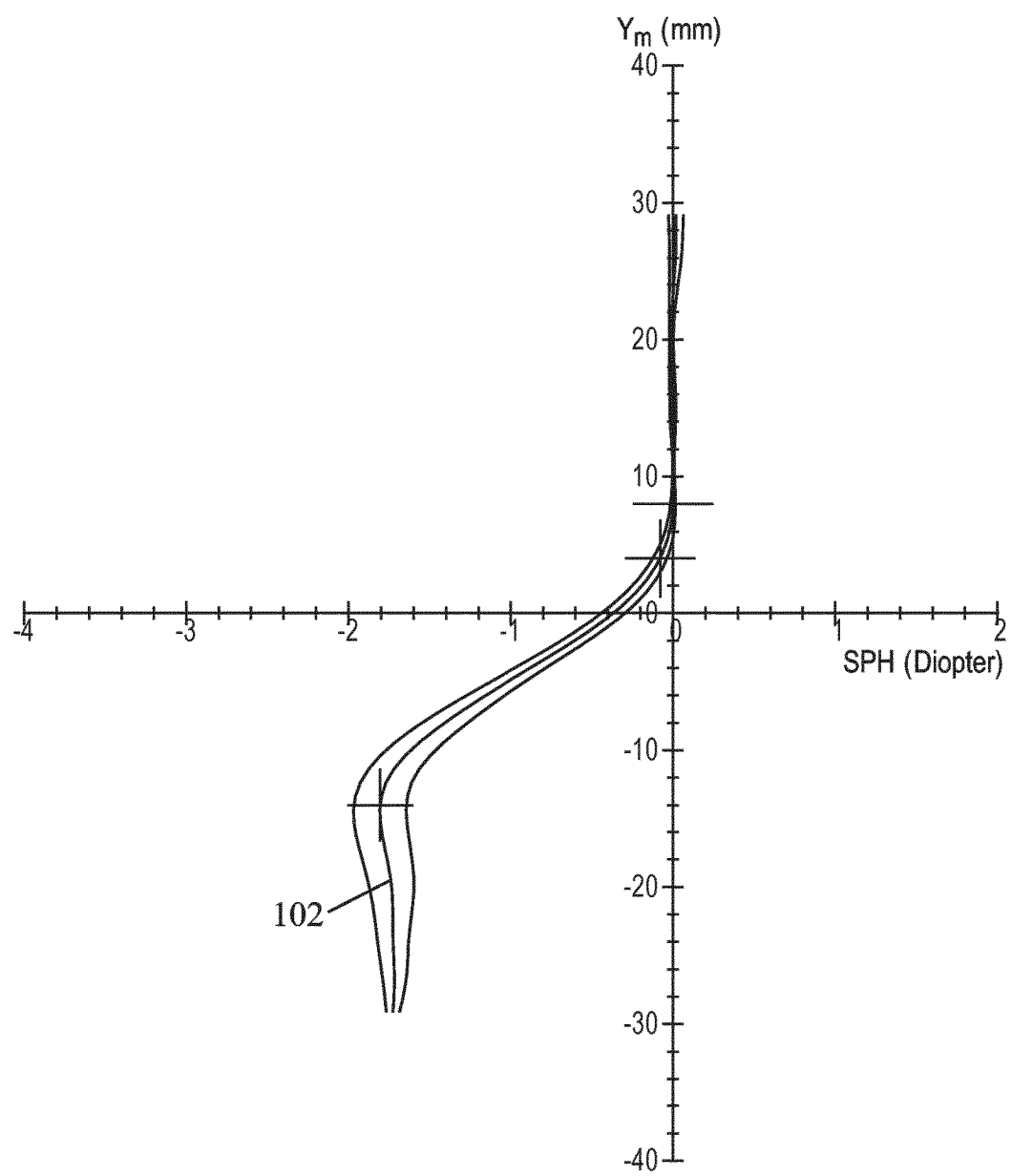
Figure 11:
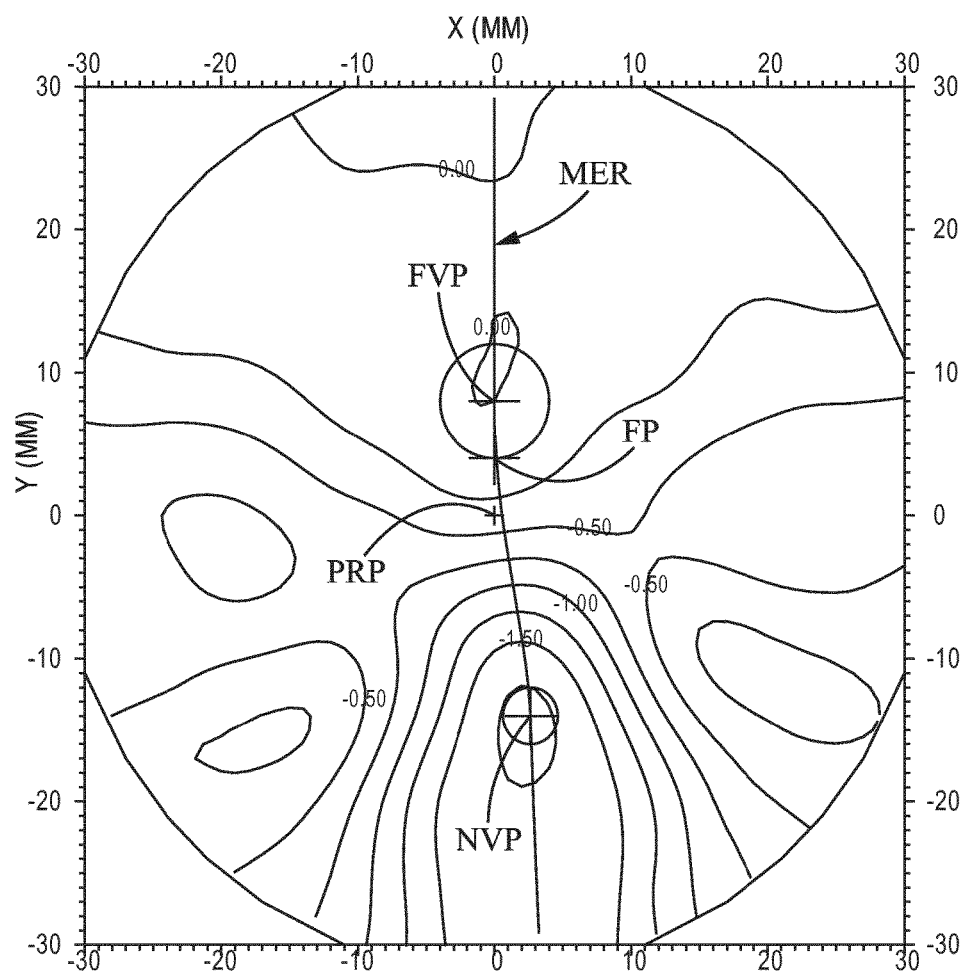

FIG. 10 shows the mean curvature variation along the meridian line of the back surface of the lens;

FIG. 11 shows the mean curvature iso-lines on the back surface of the lens.

Figure 12:
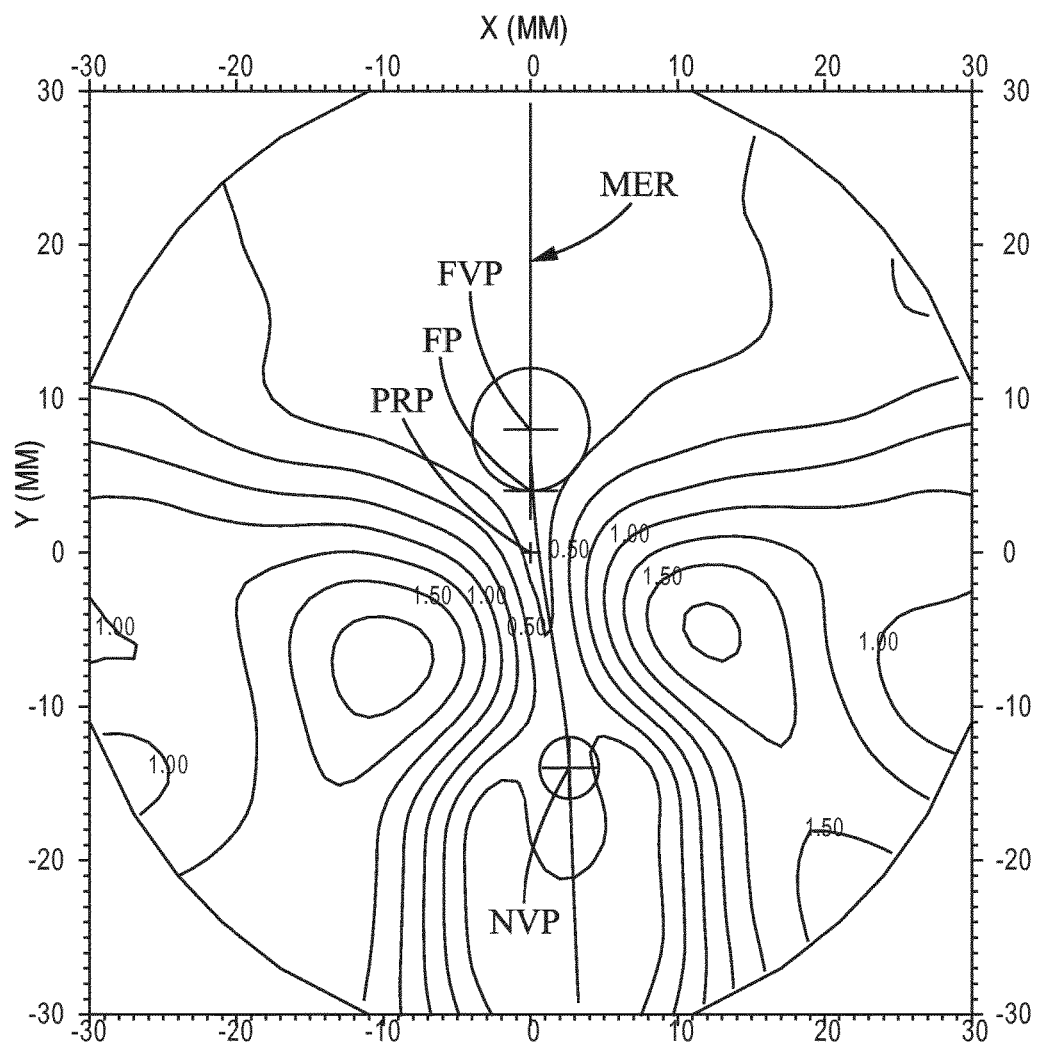

FIG. 12 shows the cylinder iso-lines on the back surface of the lens.

According to the age of the wearer (for example for a wearer being greater than 50 and less than or equal to 60 years old), a corrective value Corr of −0.25D was determined for this example.

Figure 13:
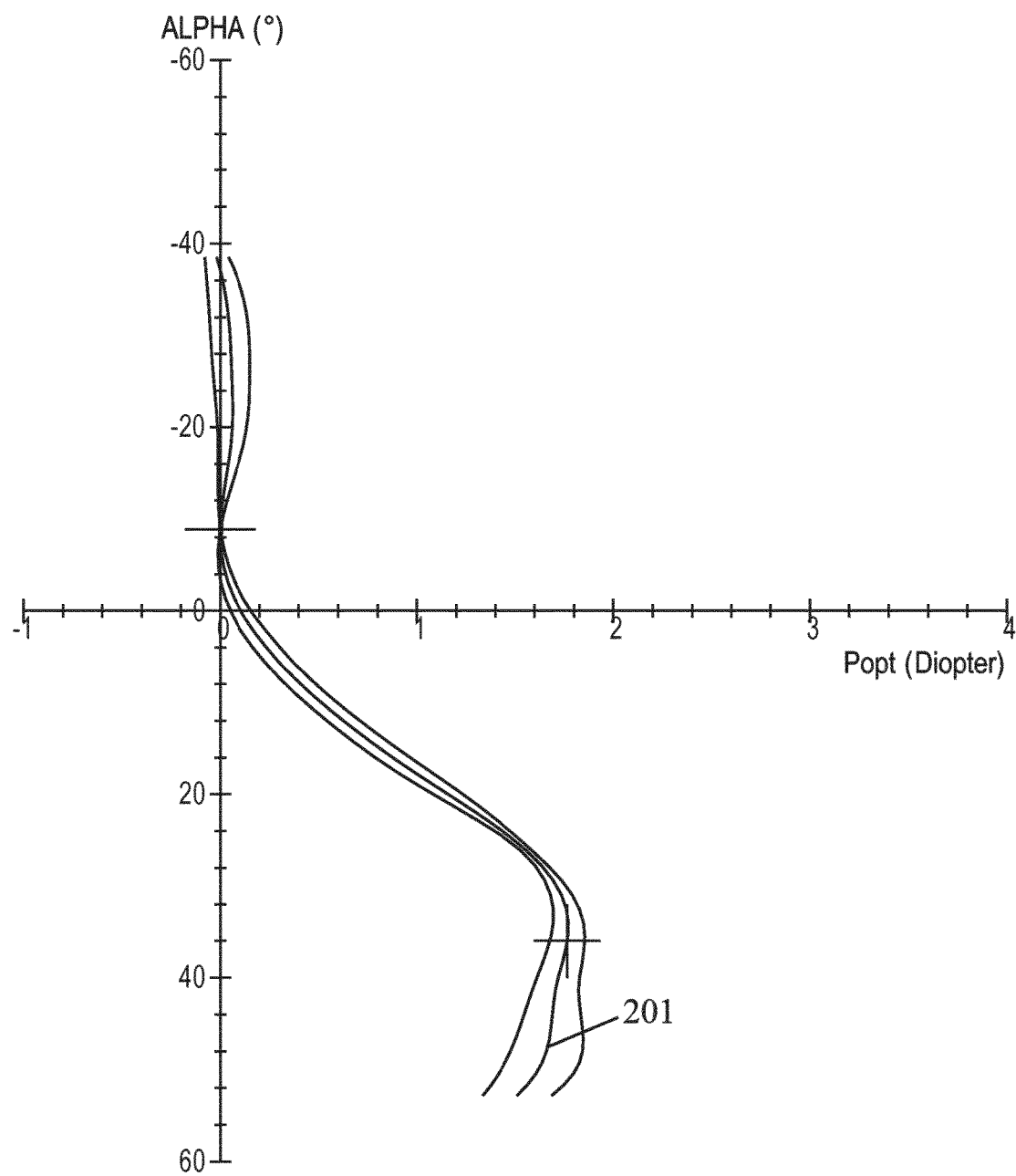
FIGS. 13 to 18 give optical and surface characteristics of a customized ophthalmic lens according to the invention.
Figure 14:
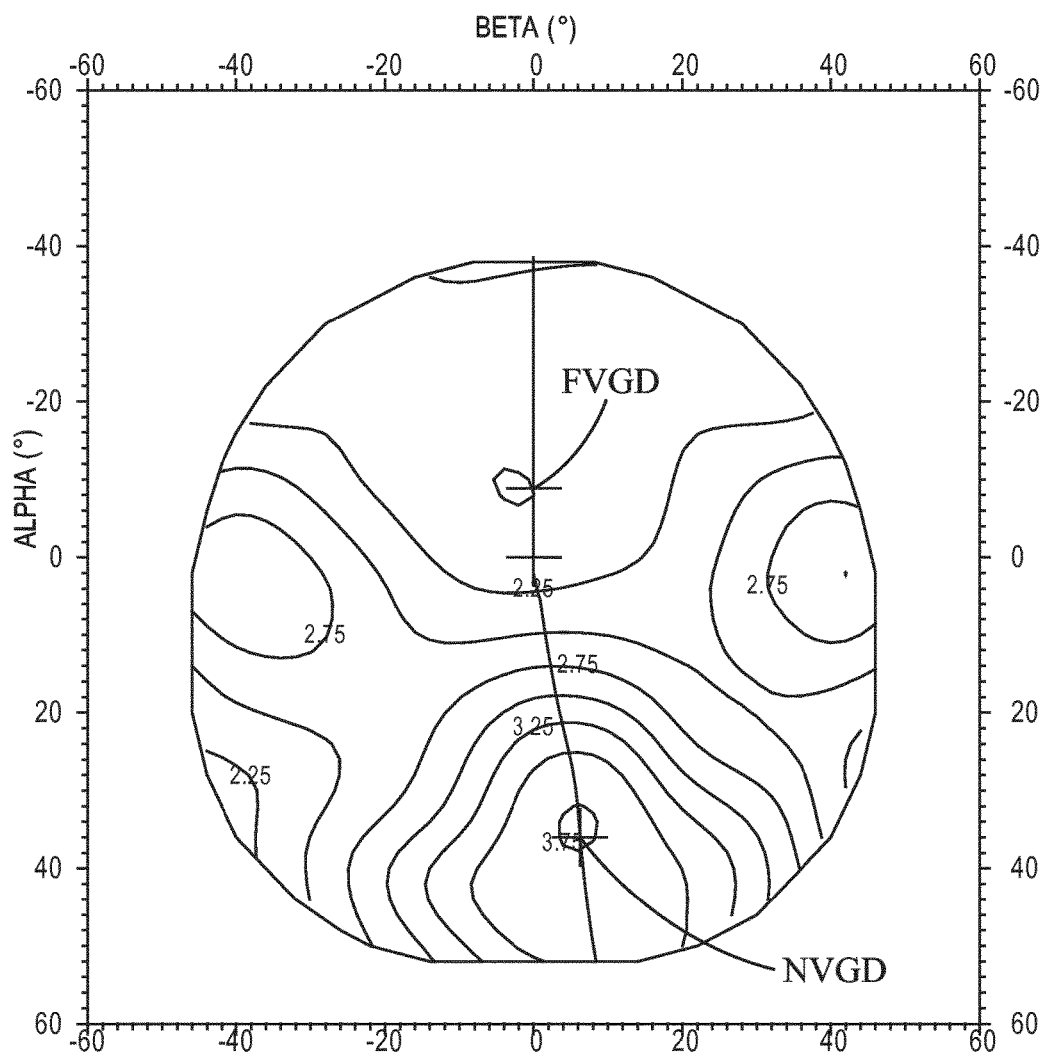
Figure 15:
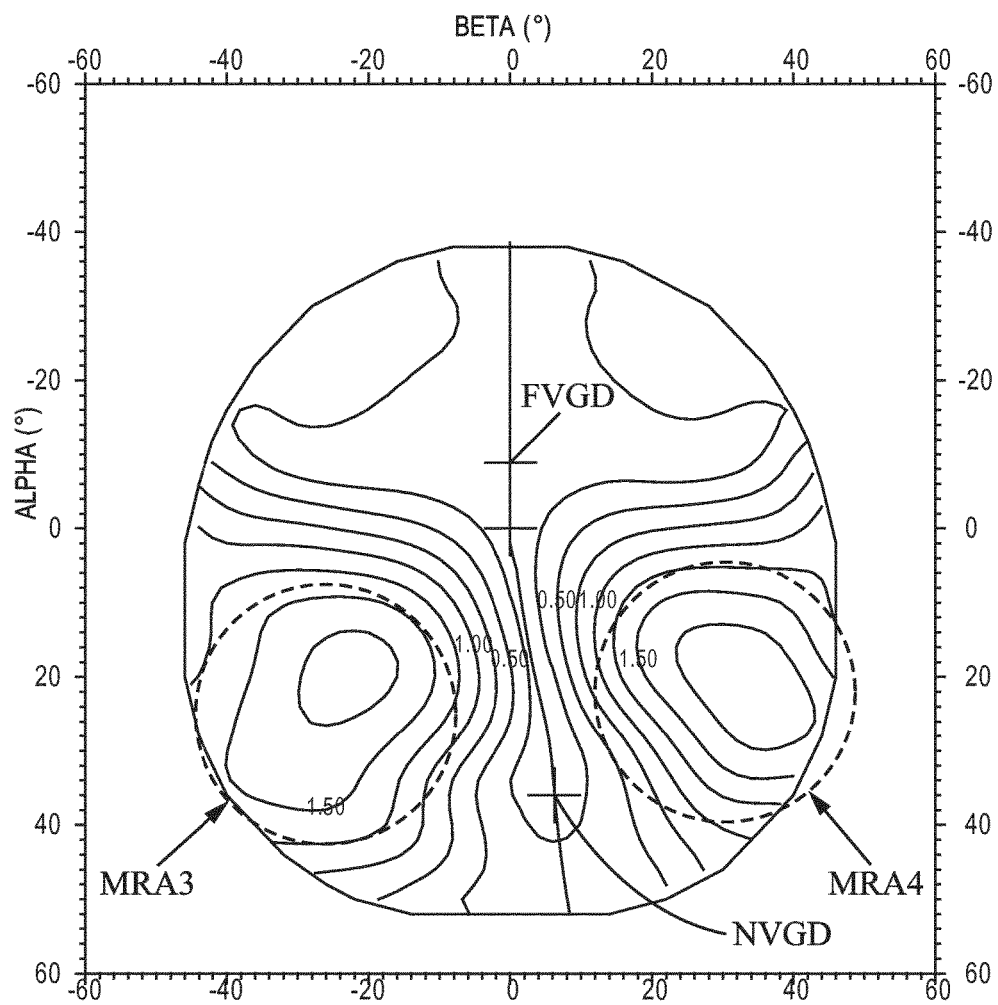
Figure 16:
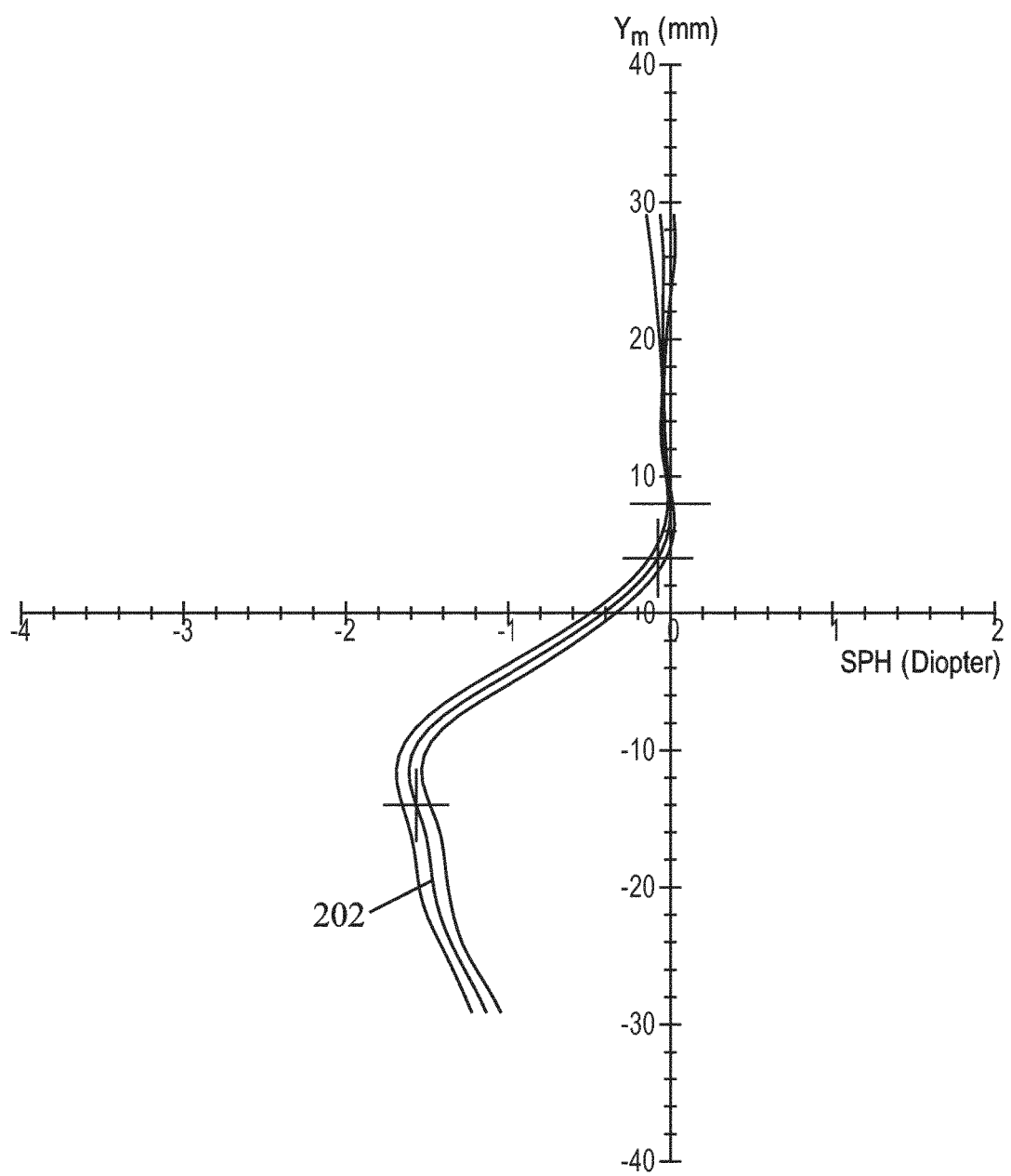
Figure 17:
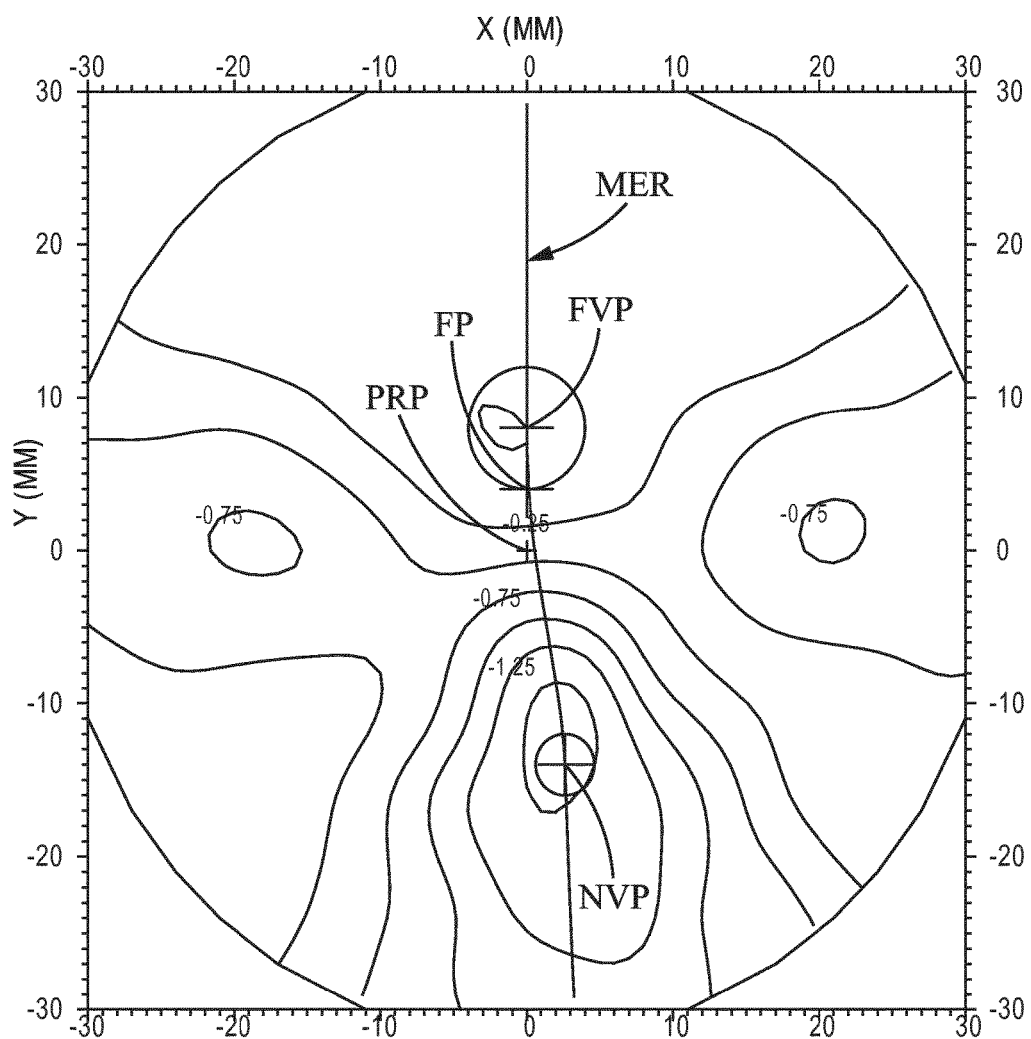
Figure 18:
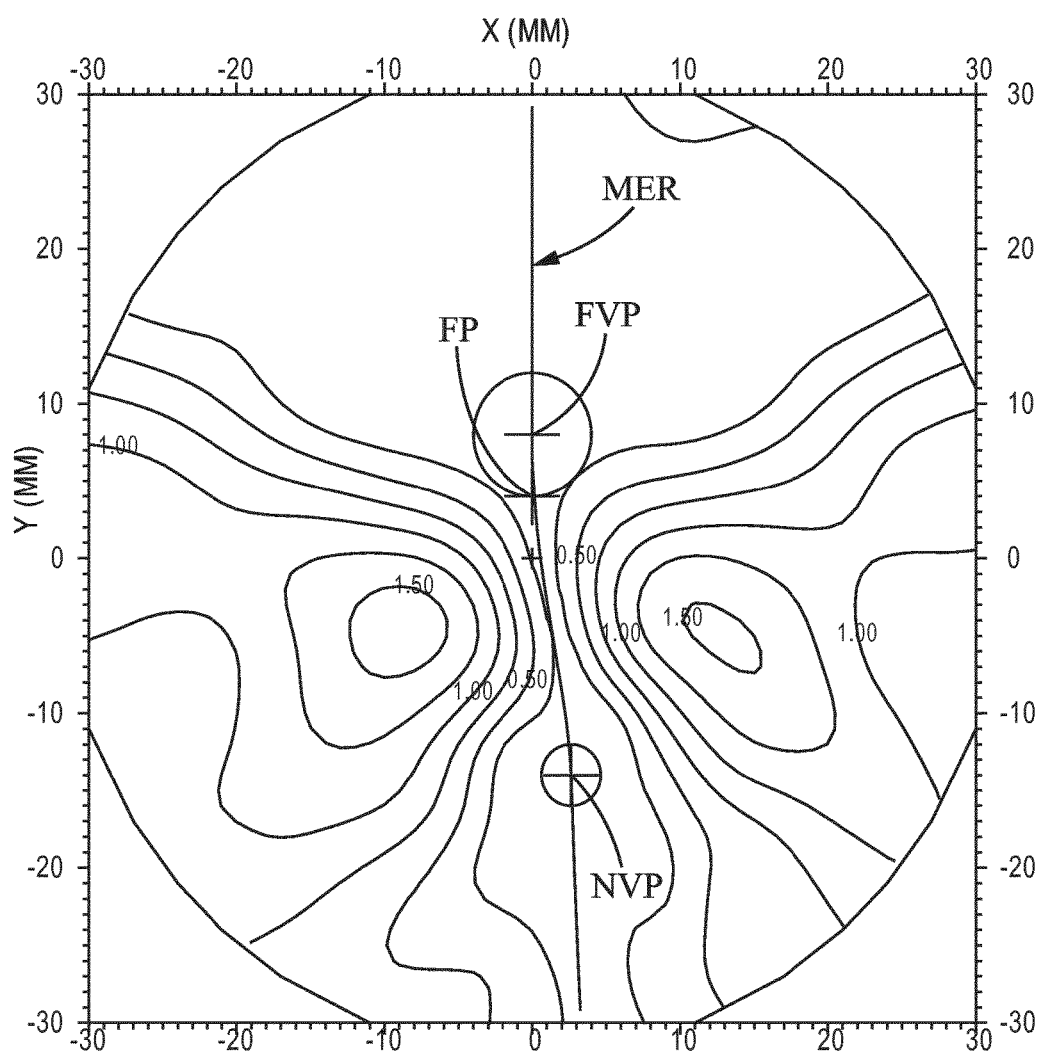

Thus, the customized progressive spectacle ophthalmic lens has to have the following parameters:
the prescribed far vision mean SPH is +2D
the prescribed astigmatism value $CYL_{FV}$ is 0D
the customized addition ($Add_c$)=$Add_p$+corr=2D−0.25D=1.75D FIGS. 13, 14, 15 represent respectively the power profile along the meridian line, the power contour plot and the astigmatism contour plot of the customized progressive spectacle ophthalmic lens according to the here above mentioned example according to the present invention.

The horizontal axis of FIGS. 7 and 13 indicate the variations of the optical power along the meridian line with respect to the optical power value produced for the gaze direction corresponding to the far vision control point. The vertical axis indicates the values of the eye declination angle α, with positive values for eye directions oriented downwards. The reference eye direction is defined for the fitting point. The central curve 101 (FIG. 7) and 102 (FIG. 13) corresponds to the mean optical power, which is calculated as an average value for planes containing the eye direction and rotated about this direction. The other curves correspond to the maximum and the minimum optical power value produced in these planes.

FIGS. 8 and 14 are optical power maps. The vertical and horizontal coordinates of the maps are respectively the values of the eye declination angle α and the eye azimuth angle β. The curves indicated in these maps connect eye directions which correspond to a same optical power value. The respective optical power values for the curves are incremented by 0.25 diopter between neighbouring curves, and are indicated on some of these curves.

FIGS. 9 and 15 are residual astigmatism contour plots, with coordinates similar to those of the optical power maps. The curves indicated connect eye directions corresponding to a same astigmatism value.

On the figures, following references correspond to followings:
FVP is the far vision point;
FP is the fitting point;
NVP is the near vision point;
MER is the meridian line;
PRP is the prism reference point
NVGD is the near vision gaze direction
FVGD is the far vision gaze direction.

Maximum residual astigmatism zones can be seen in zones MRA1, MRA2 for FIG. 9 and in zones MRA3, MRA4 for FIG. 15.

One can see that maximum residual astigmatism are reduced when comparing FIG. 15 to FIG. 9, namely within zones MRA3, MRA4 compared to MRA1, MRA2.

The comfort of a wearer is thus improved when comparing to the initial progressive spectacle ophthalmic lens. Swim effects are thus namely lowered thanks to lateral residual astigmatisms of the progressive spectacle ophthalmic lens reduction.

According to this example, the customized progressive spectacle ophthalmic lens having a customized addition ($Add_c$) less than the prescribed addition ($Add_p$) has been manufactured by maintaining the design of the initial progressive spectacle ophthalmic lens.

This was implemented thanks to a method comprising general optimization steps (see for example international patent application WO2007/017766) and comprises the specific following steps:
1/ choosing an initial distribution of power and an initial distribution of astigmatism for each gaze direction under wearing conditions corresponding to a lens suitable for fulfilling the requirements of the prescription data for the wearer;
   initial distribution of power and initial distribution of astigmatism for each gaze direction illustrated by FIGS. 7 to 9.

2/ providing a meridian line, a far vision gaze direction, a near vision gaze direction and an initial addition value $Add_{ini}$ from the initial distribution;

$$add_{ini}=2D$$

3/ calculating first transformation coefficients from the difference $(Add_{ini}-Add_c)$;

$$Add_{ini}-Add_c=2D-1.75D=0.25D$$

4/ determining a second distribution of the power and resulting astigmatism by applying the calculated first transformation coefficients to the initial distribution in order to obtain the customized addition at the near vision gaze direction;
5/ choosing a k value of 85%;
6/ determining a first reference gaze direction $Dir1(\alpha 1;\beta 1)$ on the meridian line for the initial distribution wherein the difference in mean power between the first gaze direction and the far vision gaze direction satisfies $k \times Add_{ini}$;
7/ determining a second reference gaze direction $Dir2(\alpha 2; \beta 2)$ on the meridian line for the second distribution wherein the difference in mean power between the second gaze direction and the far vision gaze direction satisfies $k \times Add_{ini}$;
8/ calculating second transformation coefficients from the differences $(\alpha 2-\alpha 1; \beta 2-\beta 1)$;
9/ determining a third distribution of the power and resulting astigmatism by applying the calculated second transformation coefficients to the second distribution in order to obtain a difference in mean power equal to $k \times Add_{ini}$ at the first gaze direction Dir1.

Figure 19:
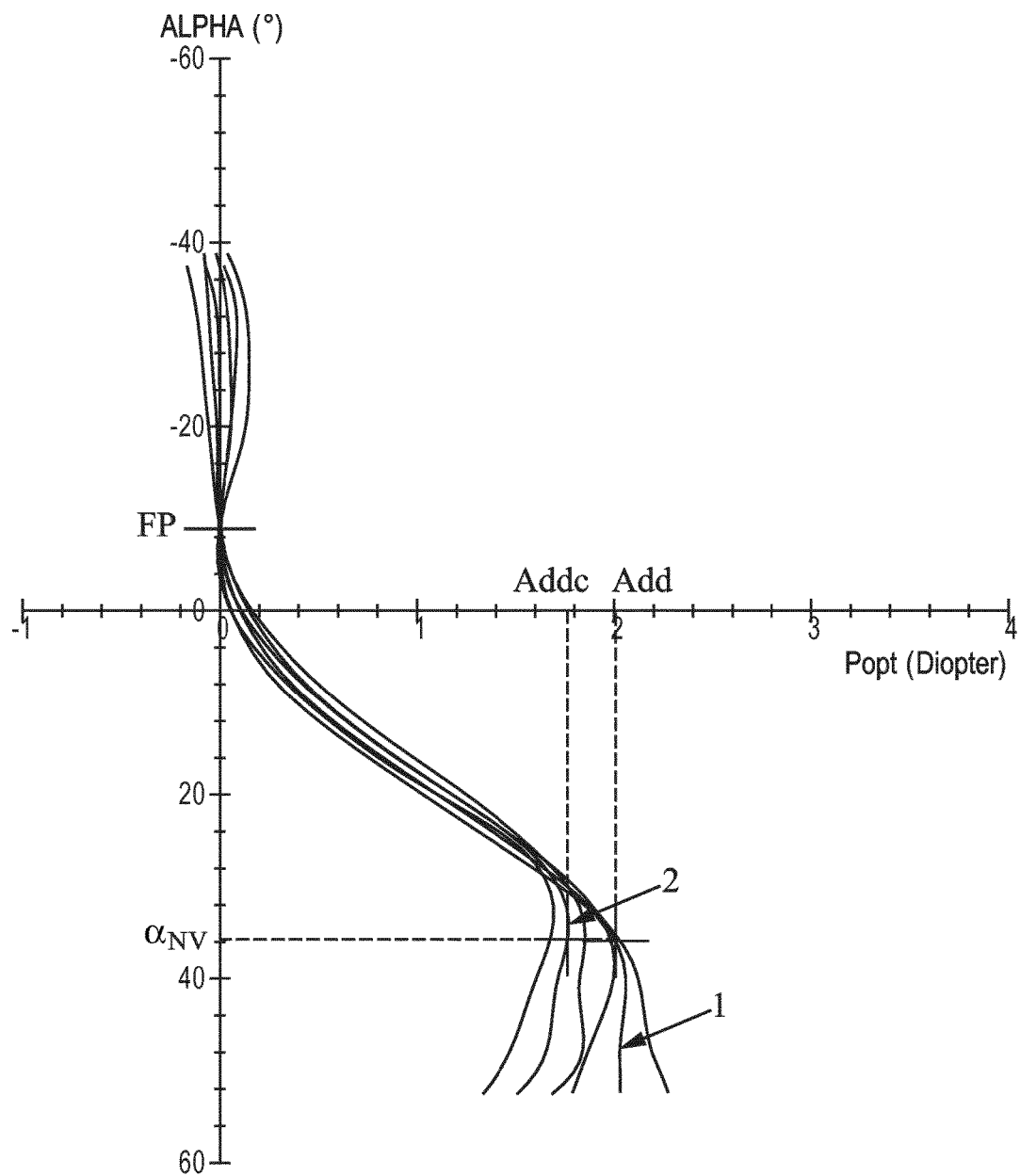
FIG. 19 represents the superimposition between the power profile along the meridian line of the initial (curve 1) and customized (curve 2) progressive spectacle ophthalmic lens.

As shown in FIG. 19, the power profile along the meridian line is substantially the same from the fitting point to point corresponding to $0.85 \times Add_{ini}$ followed by a smooth function to reach the desired customized addition (see curve 2).

Thus, thanks to the teaching of the present invention one can customize an initial progressive spectacle ophthalmic lens, leading to lower swim effects of the customized progressive spectacle ophthalmic lens while maintaining the same design as the initial progressive spectacle ophthalmic lens.

The invention has been described above with the aid of embodiments without limitation of the general inventive concept.

The invention claimed is:

1. A method for determining a multifocal progressive ophthalmic lens to be worn by a wearer for whom an addition has been prescribed in near-vision, comprising:
   providing data, the data comprising prescription data, the prescription data comprising a prescribed addition $Add_p$ obtained when the wearer is looking straight forward;
   determining a customized addition $Add_c$ according to at least the prescribed addition $Add_p$, and wherein $Add_c=Add_p+corr$, corr being a non nil value;
   choosing an initial distribution of power and an initial distribution of astigmatism for each gaze direction under wearing conditions corresponding to a lens suitable for fulfilling requirements of the prescription data for the wearer;
   providing a meridian line, a far vision gaze direction, a near vision gaze direction, and an initial addition value $Add_{ini}$ from the initial distribution;
   calculating first transformation coefficients from the difference $(Add_{ini}-Add_c)$;
   determining a second distribution of the power and resulting astigmatism by applying the calculated first transformation coefficients to the initial distribution to obtain the customized addition at the near vision gaze direction;
   choosing a k value satisfying $0\% \leq k \leq 100\%$;
   determining a first reference gaze direction $Dir1(\alpha 1;\beta 1)$ on the meridian line for the initial distribution, wherein the difference in mean power between the first gaze direction and the far vision gaze direction satisfies $k \times Add_{ini}$;
   determining a second reference gaze direction $Dir2(\alpha 2; \beta 2)$ on the meridian line for the second distribution wherein the difference in mean power between the second gaze direction and the far vision gaze direction satisfies $k \times Add_{ini}$;
   calculating second transformation coefficients from the differences $(\alpha 2-\alpha 1;\beta 2-\beta 1)$;
   determining a third distribution of the power and resulting astigmatism by applying the calculated second transformation coefficients to the second distribution in order to obtain a difference in mean power equal to $k \times Add_{ini}$ at the first gaze direction Dir1; and
   providing the progressive ophthalmic lens having said third distribution of the power and resulting astigmatism.

2. The method for determining a multifocal progressive ophthalmic lens to be worn by a wearer according to claim 1,
   wherein corr is a corrective value which is the output of a function where the input is at least an individual wearer parameter value and at least an output value over the input range is different from nil, so that the customized multifocal ophthalmic lens has an customized addition $Add_c$.

3. The method for determining a multifocal progressive ophthalmic lens according to claim 1, wherein k value is set at 85%.

4. The method for determining a multifocal progressive ophthalmic lens according to claim 1, wherein the data further comprise wearing conditions.

5. A multifocal progressive ophthalmic lens calculated by the determination method of claim 1.

6. A multifocal lens supply system, comprising:
   a multifocal lens ordering computing unit; and
   a multifocal lens determination computing unit,
   wherein:
      the multifocal lens ordering computing unit comprises:
         an input interface to input data comprising at least prescription data for a wearer, the prescription data comprising a prescribed addition value Add, which is determined when the wearer is looking straight forward, and
         an output interface to output data from the multifocal lens ordering computing unit to the multifocal lens determination computing unit, and
      the multifocal lens determination computing unit comprises:
         a determination computing unit to determine a customized multifocal progressive ophthalmic lens for the wearer, and
         a customizing computing unit which is configured to implement the determination steps of the method defined in claim 1.

7. The method for determining a multifocal progressive ophthalmic lens according to claim 1, wherein the prescribed addition value $Add_p$ is determined when the wearer is looking straight forward at a distance of 40 cm.

8. The method for determining a multifocal progressive ophthalmic lens according to claim 1, wherein the corrective value con is chosen according to following equation:

$-0.7D \leq corr \leq 0.4D$.

9. The method for determining a multifocal progressive ophthalmic lens according to claim 1, wherein $corr = (\alpha_{NV}/36) \times corr2$, corr2 is chosen according to following equation:

$-0.5D \leq corr2 \leq 0.25D$, and $\alpha_{NV}$ is an input data defining the near vision gaze direction elevation expressed in ° of the customized multifocal progressive ophthalmic lens.

10. The method for determining a multifocal progressive ophthalmic lens according to claim 1, wherein the individual wearer parameter is an age of the wearer.

11. The method for determining a multifocal progressive ophthalmic lens according to claim 10, wherein the corrective value corr is chosen according to following equations:

$-0.5D \leq corr \leq -0.4D$, if the wearer is less than or equal to 50 years old, $-0.4D \leq corr \leq -0.1D$, if the wearer is greater than 50 years old and less than or equal to 60 years old, and $0.0D \leq corr \leq 0.25D$, if wearer is greater than 60 years old.

12. The method for determining a multifocal progressive ophthalmic lens according to claim 10, wherein the corrective value corr depends on a used prescription method.

13. The method for determining a multifocal progressive ophthalmic lens according to claim 12, wherein:

if the prescription method is an accommodation amplitude method for the addition value determination, the corrective value corr is chosen according to following equations:

$-0.6D \leq corr \leq -0.4D$, if the wearer is less than or equal to 50 years old, $-0.4D \leq corr \leq -0.1D$, if the wearer is greater than 50 years old and less than or equal to 60 years old, and $0D \leq corr \leq 0.3D$, if the wearer is greater than 60 years old, if the prescription method is the Jackson cross cylinder method for the addition value determination, the corrective value con is chosen according to following equations:

$-0.4D \leq corr \leq -0.1D$, if the wearer is less than or equal to 50 years old, and $corr = 0D$, if the wearer is greater than 50 years old, and if the prescription method is a red/green method for the addition value determination, the corrective value corr is chosen according to following equations:

$-0.6D \leq corr \leq -0.4D$, if the wearer is less than or equal to 50 years old, and $-0.4D \leq corr \leq -0.1D$, if the wearer is greater than 50 years old.

14. The method for determining a multifocal progressive ophthalmic lens according to claim 1, wherein the individual wearer parameter is the prescribed addition, and wherein:

$-0.6D \leq corr \leq -0.4D$, if $Add_p < 2.0D$, $-0.4D \leq corr \leq -0.1D$, if $2.0D \leq Add_p < 2.5D$, and $0.1D \leq corr \leq 0.4D$, if $Add_p \geq 2.5D$.

* * * * *